UNITED STATES PATENT OFFICE.

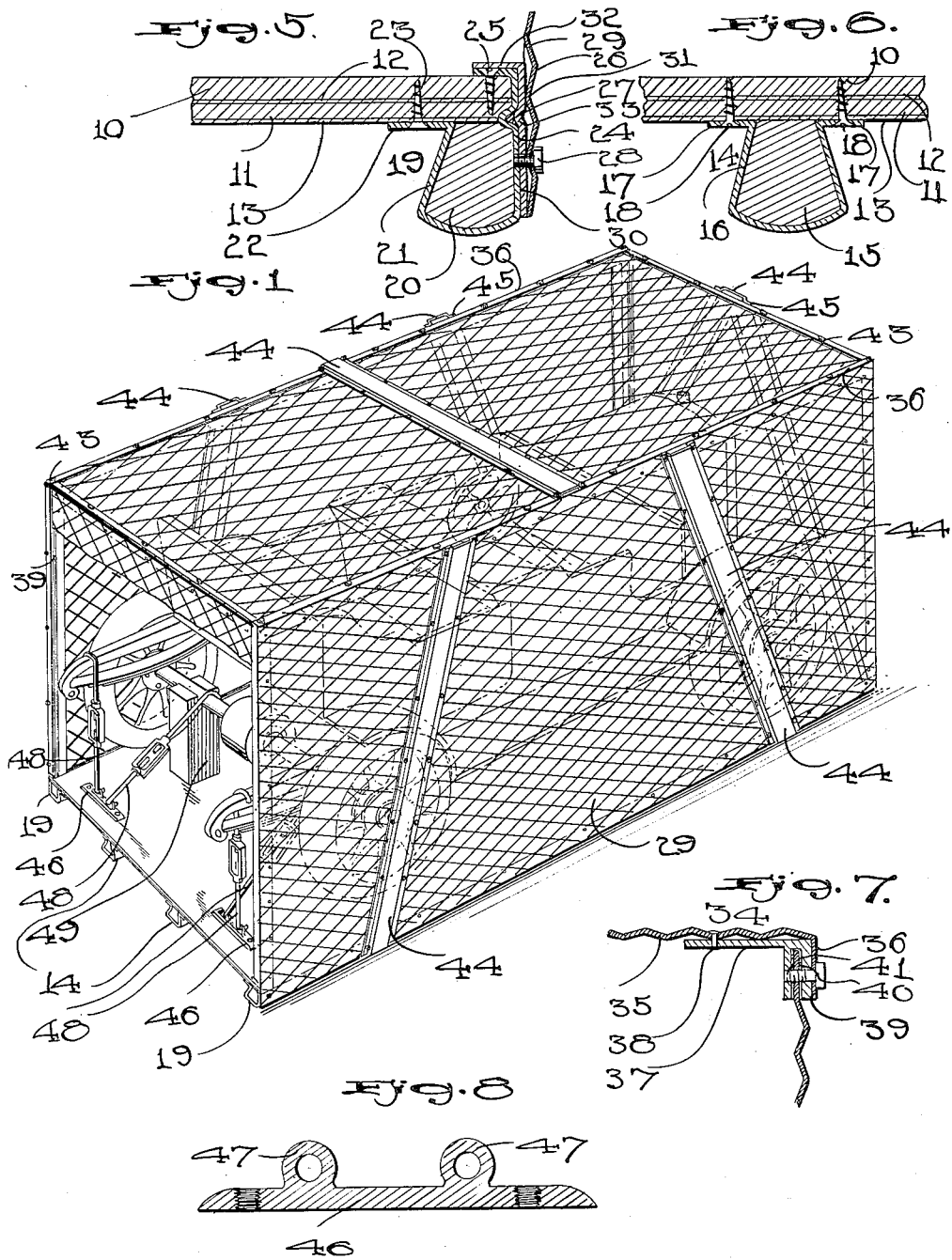

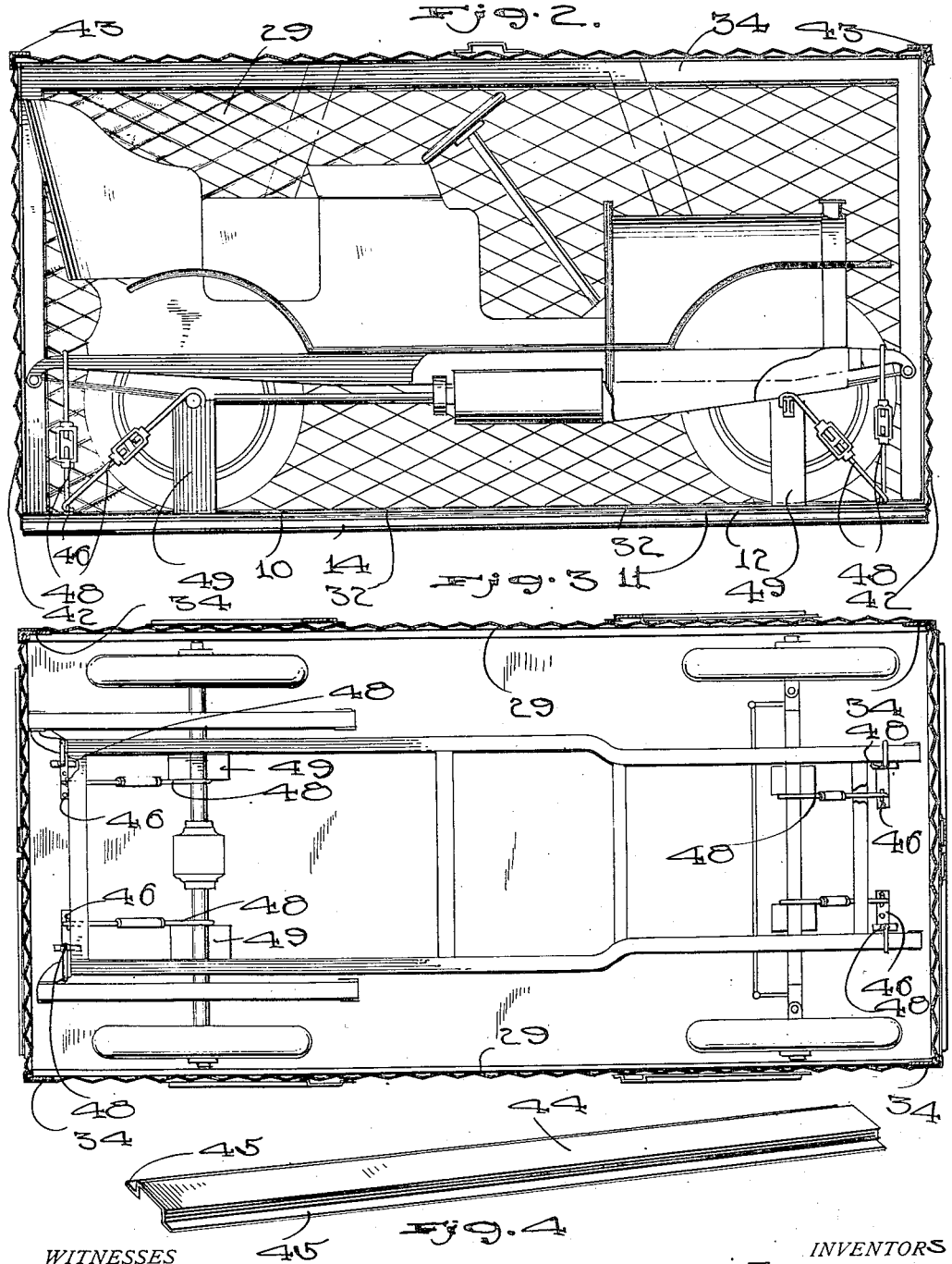

THOMAS JORY AND GUSTAVE A. GRIMM, OF CHICAGO, ILLINOIS.

DEMOUNTABLE SHIPPING-BOX FOR AUTOMOBILES.

1,086,670.  Specification of Letters Patent.  Patented Feb. 10, 1914.

Application filed January 14, 1913. Serial No. 742,022.

*To all whom it may concern:*

Be it known that we, THOMAS JORY and GUSTAVE ADAM GRIMM, citizens of the United States of America, residing at Chicago, in the county of Cook and State of Illinois, have invented certain new and useful Improvements in Demountable Shipping-Boxes for Automobiles, of which the following is a specification, reference being had therein to the accompanying drawing.

This invention relates to shipping crates, and the principal object of the invention is to provide a shipping crate in which an automobile or other vehicle may be placed when shipping the automobile from one town to another.

Another object of the invention is to provide a crate of the character described which will be very strong in construction and which will be fire proof and water proof.

Another object of the invention is to provide an improved construction for the crate so that the different portions of the crate may be taken apart and thus the crate packed in a small amount of space when in use.

In the accompanying drawings:—Figure 1 is a perspective view of the crate with one of the end walls broken away. Fig. 2 is a longitudinal vertical sectional view through the crate with an automobile mounted therein. Fig. 3 is a transverse longitudinal sectional view through the crate with an automobile mounted therein. Fig. 4 is a perspective view of one of the bracing strips by means of which the walls and top of the crate are reinforced. Fig. 5 is a fragmentary sectional view through the bottom of the crate showing the manner of connecting the side walls with the bottom. Fig. 6 is a fragmentary sectional view through the bottom to show the manner of securing the intermediate supporting strips to the bottom. Fig. 7 is a fragmentary sectional view through the top of the crate to show the manner of connecting the top with the side walls, the strip at the upper edge of the end wall being removed. Fig. 8 is a longitudinal sectional view through one of the brackets to which the securing clamps for the automobile are connected.

This crate comprises a bottom having the two sections 10 and 11, a packing 12 of rubber or some other similar substance being placed between the sections, and a layer of asbestos being secured to the lower section. It will thus be seen that the asbestos layer 13 protects the bottom of the crate from fire and that the rubber packing 12 prevents dampness from passing through the bottom.

A plurality of longitudinally extending supporting strips 14 are secured to the bottom of the crate so that the crate will be held in spaced relation to the floor upon which it rests and so that the crate may be more readily moved. Each of these strips 14 comprises a filler 15 preferably formed of wood or some other similar material and a metallic covering 16 which has its edges bent to form the feet 17 through which the securing screws 18 pass. It should be noted that the lower face of the filler 15 is curved, thus causing the supporting strips to form runners so that the crate will move easily. Additional supporting strips are secured to the bottom one being positioned on each of the longitudinal edges. These strips are indicated by the numeral 19 in Fig. 1, and by referring to Fig. 5 it will be seen that each comprises a filler 20 similar to the filler 15, and a metallic covering 21. This metallic covering 21 has one side bent to form the strip 22 which is secured to the bottom of the crate by means of the screws 23, and has its remaining side 24 carried along the edge of the bottom and bent over and secured to the bottom by means of the screws 25. This side 24 is crimped intermediate its height to form the pocket 26 in which a packing 27 of rubber or other similar material is placed.

The side walls are secured to the bottom by means of bolts 28 which pass through the side walls and into the supporting strips 19. Each of these side walls comprises a metallic sheet 29 which is corrugated for the purpose of giving additional strength. A longitudinally extending metallic strip 30 is secured to the lower edge portion of each side wall upon the inner side and is held in place by suitable rivets 31. This strip 30 is provided with a flange 32 at its upper edge which overhangs the bottom and rests upon the bent down edge portion of the side wall 24. It will thus be seen that when the crate is assembled that this flange 32 covers the screws 25 thus preventing any danger of the screws working loose. The strip is crimped intermediate its height to form a rib 33 which engages the packing 27 and compresses the same so that a water tight joint is formed between the side walls and the bottom. Vertical strips 34 are secured to the ends of the side walls and are each provided with a slotted flange in which the end walls fit. These strips 34 are similar in construction to the strips which are secured to the top and shown in Fig. 7.

The top comprises a metallic sheet 35 which is provided with corrugations similar to the side walls and has its side edges bent to form depending flanges 36 positioned outside the side walls. Strips 37 are secured to the inner face of the top by means of rivets 38 and are each provided with a depending slotted flange 39 in which the upper edge of one side fits. A packing 40 of rubber or some other suitable material is placed in the slot formed in the flange 39 so that when the securing bolts 41 are tightened a water tight joint will be formed between the top and the sides.

The end walls 42 extend from the top, and have their upper edges reinforced by the strips 43. It is of course obvious that these end walls fit in the slotted flanges of the strips 34 and are secured in place by means of bolts similar to the manner in which the side walls are connected with the slotted flanges 39.

The top and walls are provided with bracing members 44 one of which is shown in perspective in Fig. 4. Each of these bracing members is formed from a channel bar which has its side wall bent outwardly to form the flanges 45 through which the securing bolts pass. In the drawings the top has been shown provided with a central brace, and the side and end walls each with two braces which extend diagonally. It is of course obvious that any number of braces may be provided according to the size of the crate which is formed. These bracing members greatly strengthen the crate and prevent any danger of the walls becoming warped when packed away.

Brackets 46 are secured to the bottom and are provided with eyes 47 with which the turn-buckle clamps 48 are connected. The automobile is placed in the crate with the axles supported upon the blocks 49 and the turn-buckle clamps are then connected with the axles and springs and tightened so that the automobile will be securely held in position and prevented from having any movement whatever in the crate.

An automobile packed in this crate may be safely shipped to any point desired without danger of it being broken, or may be safely stored in a storage house without any fear of damage to the machine from fire or dampness. The walls and top of the crate are formed from metal and, therefore, the upper portion of the crate is fire proof and the bottom is protected by an asbestos covering so that this is also fire proof. All of the joints which connect the several parts of the crate are provided with the rubber or other suitable packings, and therefore, it is not possible for dampness to pass in to the crate and thus the crate will not be damaged by moisture.

Having thus described the invention what is claimed as new, is:—

A shipping crate comprising a bottom, supporting strips secured to said bottom, each of said strips comprising a filler, a metallic covering for said filler, the metallic cover of each edge strip having its inner edge portion bent to form a flange secured to the bottom of said crate, the outer side portion of said covering being carried over the edge of the bottom and bent to form a flange secured to the upper face of said bottom, said outer side being crimped intermediate its height to form a longitudinally extending pocket, a packing positioned in said pocket, side and end walls extending from said bottom, a strip secured to the lower edge of each of said side walls and provided with a flange resting upon the bottom of said crate and crimped intermediate its height to form a rib comprising side packing to form a water tight joint between the side wall and the bottom, and a cover carried by said walls.

In testimony whereof we hereunto affix our signatures in presence of two witnesses.

THOMAS JORY.
GUSTAVE A. GRIMM.

Witnesses:
  MARGARET W. JORY,
  LOUISE M. GRIMM.